Figure 1:
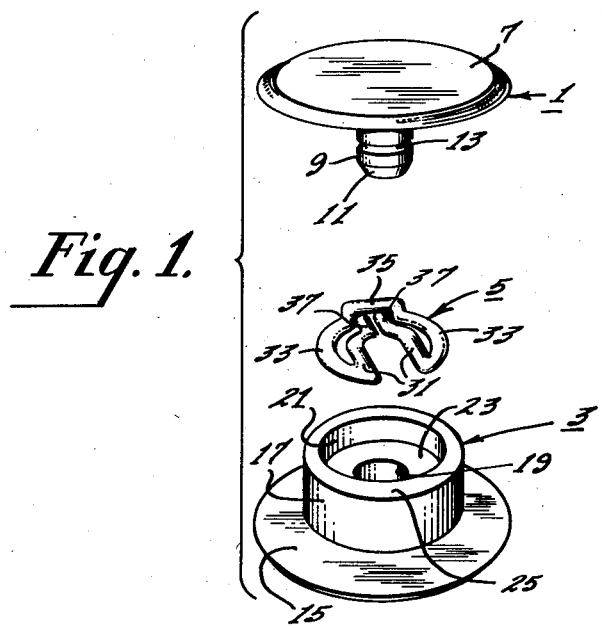

Nov. 6, 1956  H. A. MAIMAN  2,769,221
SEPARABLE FASTENERS
Filed May 20, 1953

INVENTOR.
Herbert A. Maiman
BY Morris A. Rabkin
ATTORNEY

_United States Patent Office_

2,769,221
Patented Nov. 6, 1956

2,769,221
SEPARABLE FASTENERS

Herbert A. Maiman, Havertown, Pa., assignor of one-half to H. Robert Mandell, New York, N. Y.

Application May 20, 1953, Serial No. 356,126
4 Claims. (Cl. 24—216)

This invention relates to separable fasteners, and more particularly to snap fasteners of the stud and socket type, the present invention being an improvement over that disclosed in my copending application, Serial No. 326,691, filed December 18, 1952.

In my aforesaid copending application, there is disclosed a stud and socket type fastener the socket or female portion of which is formed of a tubular member having a first bore of relatively small diameter throughout most of its length, a second bore of somewhat larger diameter at its stud receiving end, and an intermediate bore of still larger diameter located between the first and second bores. This intermediate bore constitutes a seat for a spring designed to hold the stud or male portion of the fastener in mated relation with the socket portion. The spring is formed with a generally circular, intermediate, peripheral portion which terminates in a pair of inwardly directed, substantially parallel arms within the peripheral portion, the ends of these arms terminating at points spaced somewhat from the aforementioned peripheral portion, and the two arms, as well as the circular, peripheral portion, lying in a common plane. When the stud of the male portion is inserted into the tubular member of the socket portion, the stud is engaged by the parallel spring arms, which snap into a peripheral groove in the stud, to releasably hold the male member in mated relation with the female or socket member.

In general, the construction disclosed in my said copending application is quite satisfactory for many applications. However, I have found that, in some cases, the parallel end sections or arms of the spring have a tendency to be pulled out of the plane thereof and become more or less set out of this plane after many insertions and withdrawals of the stud from the socket. Also, while the socket structure disclosed in my aforesaid copending application is entirely suitable for its intended purpose, I have found that it can be simplified considerably without losing any of its advantages or efficiency.

The primary object of my present invention, therefore, is to provide an improved separable fastener of the stud and socket type which is free from the aforementioned limitations of the fastener of my previously identified, copending application.

More particularly, it is an object of my present invention to provide, in a snap fastener of the stud and socket type, an improved form of stud retaining spring which will remain effective to cooperate with the stud at all times during the life of the fastener.

Another object of my present invention is to provide an improved form of stud retaining spring of the type set forth in which the stud retaining arms are so arranged in relation to the peripheral portion of the spring that they will be held in place positively at all times and cannot become set out of the common plane thereof.

Still another object of my present invention is to provide, in a snap fastener of the type specified, an improved and simplified socket or female member and a simplified method of assembling the socket and its stud retaining spring.

A further object of my present invention is to provide an improved separable fastener of the type described which lends itself readily to a great number and variety of uses.

Still a further object of my invention is to provide an improved separable fastener as set forth above which is extremely simple and compact in construction, the parts of which can be mated and separated with great ease, and which is positive in action at all times, neat in appearance and highly efficient in use.

It is also an object of my present invention to provide an improved separable fastener of the stud and socket type which is comprised of a minimum number of parts, which can be fabricated easily, which is inexpensive to produce, and which readily lends itself to large quantity manufacture.

In accordance with one form of my present invention, the female or socket portion of my improved fastener is formed of a tubular member, as heretofore, but in the present instance, the tubular member is provided merely with two bores, rather than with three, as in the socket of my earlier application identified above. The first bore of the present socket, as in the earlier one, extends from the base of the socket throughout the major portion of the length of the tubular member thereof and is of relatively small diameter just slightly larger than the diameter of the cooperating stud. This first bore terminates in a shoulder or seat on which the stud retaining spring of the present invention rests and beyond which the tubular member is formed with a second bore of larger diameter to provide said shoulder and above said shoulder a relatively thin wall portion. This thin wall is deformed inwardly by a suitable pressing operation at a number of spaced points circumferentially therearound to provide a plurality of circumferentially spaced prongs over the spring to retain it on the aforementioned shoulder. Thus, the machining of the socket member and the assembly therewith of the stud retaining spring are greatly simplified.

The improved stud retaining spring of the present invention has, like the spring of my aforesaid copending application, a pair of generally parallel arms arranged to engage the stud of the fastener to hold it in mated relation with the socket member. These stud engaging arms, which may be of various contours or shapes longitudinally, are surrounded by a generally circular, peripheral portion which has diametrically opposed parts extending from and lying in a common plane with said arms, and an intermediate, raised, arm restraining section connecting said diametrically opposed parts and disposed above said common plane. The free ends of the spring arms extend under this raised section of the spring. Thus, as the stud is withdrawn from the socket, the spring arms are restrained by this raised section of the spring from being pulled out of their common plane by the withdrawing stud. Similarly, since the spring arms rest on the aforementioned shoulder, they again cannot be displaced from their common plane by the entering stud upon insertion thereof into the socket. Hence, the effectiveness of the spring arms is retained at all times. As in the case of the fastener of my previously mentioned, copending application, the improved fastener of the present invention readily lends itself to a great variety of uses and applications, as in loose leaf binders including report covers, catalogues and sample cases, clothing such as coats, trousers, jackets, shoes and galoshes, coat lapel buttons, military insignia, cap or hat emblems, identification badges, cuff links and other articles of jewelry and adornment, pouches or bags and the like receptacles, curtains, belts, etc.

Figure 2:
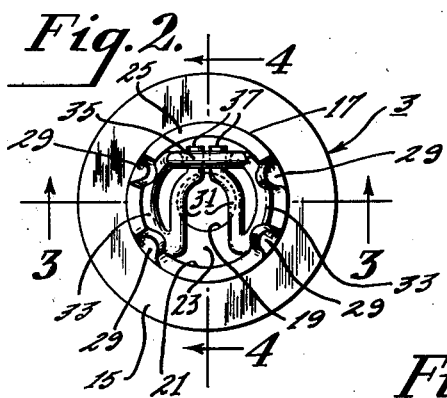
Figure 3:
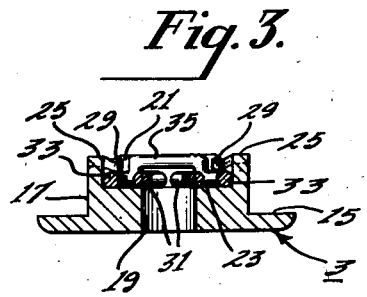
Figure 4:
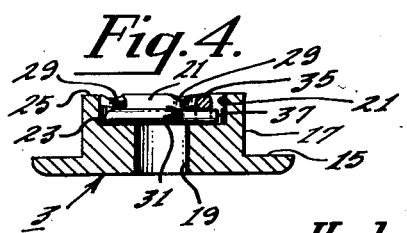

The invention itself, as well as additional objects and advantages thereof, will be better understood from the following description of one embodiment thereof, when read in connection with the accompanying drawing, in which:

Figure 1 is an exploded view, in perspective, of one form of separable fastener according to my present invention, Figure 2 is a top plan view of the improved and simplified socket member of the present invention with the improved stud retaining spring shown mounted therein, Figure 3 is a sectional view taken on the line 3—3 of Figure 2, and Figure 4 is a sectional view taken on the line 4—4 of Figure 2.

Referring more particularly to the drawing, there is shown, in Figure 1, a separable fastener comprising a male or stud member 1, a female or socket member 3, and a stud retaining member 5 which is mounted on the socket member 3 for cooperation with the stud member 1 to releasably retain the members 1 and 3 in mated relation when the stud of the male member is inserted into the socket member. The stud member 1 has a relatively large head 7 from which extends a shank or stud 9. The free end portion 11 of the stud 9 is preferably tapered to facilitate entrance of the stud shank into the female or socket member of the fastener. The stud 9 is also provided with a circumferential groove 13 in the periphery thereof, the groove 13 being spaced axially from the end portion 11 and being provided for a purpose presently to be set forth.

The socket member 3 also has a relatively large head 15 from which extends a tubular socket 17. The head 15 and the socket 17 are formed with an axial bore 19 of relatively small diameter along the major portion of the length of the socket. The diameter of the bore 19 is equal approximately to the diameter of the stud 9 and is only enough larger than the latter to receive the stud 9 with a loose, sliding fit. At its other, stud receiving end, the socket 17 is formed with a second and short, axial bore 21 of larger diameter than the bore 19 and of a depth indicated hereinafter, the bore 19 terminating in an annular shoulder 23 on which the spring 5 rests, and the bore 21 extending down to the shoulder 23. By reason of the larger diameter of the bore 21, the upper, stud receiving end of the socket 17 has a relatively thin, cylindrical wall 25. Also, since the end portion 11 of the stud 9 is tapered to a reduced diameter at its extreme end and the bore 21 is of considerably larger diameter than the stud 9, it will be apparent that the stud 9 can be inserted easily into the socket 17 even if the stud and socket members are not accurately aligned axially.

The spring 5 is made of a length of resilient wire and has a pair of spaced, parallel arms 31 which may be formed to various shapes and which cooperate with the stud 9. Connecting and surrounding the arms 31 is a generally circular, peripheral portion having diametrically opposed, circularly curved parts 33 disposed in a common plane with the two arms 31, and a raised connecting section 35 disposed above the aforementioned, common plane and connecting the curved parts 33. The free end portions 37 of the arms 31 may be brought into closer relation with each other than the arms 31, themselves, if desired, as seen in Figures 1, 2 and 3, but in any case, the end portions 37 extend under (and beyond, if desired) the restraining section 35.

The socket 3 and the spring 5 are assembled by merely placing the spring on the seat or shoulder 23 with the restraining section above the shoulder, and then deforming small portions of the cylindrical wall 25 inwardly at circumferentially spaced points therearound to provide a plurality of circumferentially spaced prongs 29 which are pressed down tightly over the curved portions 33 of the spring. The axial height or depth of the bore 21 should, of course, be sufficient to accommodate the spring 5 with the raised section 35 thereof no higher than the upper end of the wall 25. The curved portions 33 are preferably formed on an outside diameter which is slightly larger than the diameter of the bore 21. To seat the spring on the shoulder 23, it is then necessary to compress the spring slightly, and when the spring expands, it fits snugly against the wall 25. The arms 31 are spaced apart a distance less than the diameters of the bore 19 in the socket 17 and the groove 13 in the stud 9. Thus, when the stud 9 is inserted into the socket 17, the tapered end 11 of the stud engages the spring arms 31 and spreads them apart to permit entrance of the stud shank into the bore 19. Then, when the groove 13 is in line with the arms 31, the arms snap into the groove 13 to releasably, yet firmly, lock the male member 1 in mated relation with the female member 3. Since the ends 37 of the spring arms 31 rest on the shoulder 23, it is clear that the stud 9, upon insertion thereof into the socket, cannot push the arms 31 downwardly out of their set position in the plane common with the curved portions 33. Similarly, upon withdrawal of the stud from the socket, the stud 9 cannot pull the arms 31 upwardly out of the aforementioned plane because the arm ends 37 are in engagement with the restraining section 35 which restrains upward movement of the arms 31. Hence, it will be apparent that the arms 31 will always remain in their intended plane and that proper operation thereof is assured.

From the foregoing description, it will be apparent that I have provided a greatly improved, yet simple, separable fastener which readily lends itself to a large variety of uses. Although I have shown and described only a single form of my invention, it will undoubtedly be apparent to those skilled in the art that other forms thereof are possible. I therefore desire that the foregoing shall be taken as illustrative and not as limiting.

I claim as my invention:

1. In a separable fastener of the stud and socket type, the combination of a socket having a first bore of relatively small diameter terminating in a shoulder, said socket also having a second bore of larger diameter than said first bore beyond said shoulder to provide a relatively thin wall portion on said socket, a stud retaining member mounted on said shoulder, said stud retaining member having a pair of spaced arms adapted to engage a stud inserted into said socket and a peripheral portion connecting said arms and disposed thereabout, said peripheral portion having parts in a common plane and another part spaced from said common plane and connecting said common plane parts, and a plurality of circumferentially spaced prongs on said thin wall portion extending over onto those of said stud retaining member peripheral portion parts as are disposed in said common plane and holding said stud retaining member against said shoulder.

2. The invention set forth in claim 1 characterized in that said prongs are constituted by inwardly deformed sections of said wall portion which engage said peripheral portion parts.

3. The invention set forth in claim 1 characterized in that said stud retaining member arms are also disposed in said common plane.

4. A stud retaining member for snap fasteners of the stud and socket type comprising a length of resilient material having a pair of spaced arms terminating in free ends adapted to engage the stud and also having a peripheral portion about said arms, said peripheral portion having oppositely disposed parts extending from said arms and disposed with said arms in a common plane, and an intermediate restraining part connecting said oppositely disposed parts and disposed in spaced relation to said plane, the free ends of said arms extending under said intermediate part and being restrained by said intermediate part against movement out of said common plane in a predetermined direction.

References Cited in the file of this patent
UNITED STATES PATENTS

| | | |
|---|---|---|
| 543,628 | Marsh | July 30, 1895 |
| 942,542 | Carr | Dec. 7, 1909 |

FOREIGN PATENTS

| | | |
|---|---|---|
| 166,689 | Great Britain | July 10, 1921 |